United States Patent [19]
Wassom et al.

[11] Patent Number: 5,398,887
[45] Date of Patent: Mar. 21, 1995

[54] FINLESS AERODYNAMIC CONTROL SYSTEM

[75] Inventors: Steven R. Wassom, Smithfield; Girard H. Rapp; Robert B. Smalley, both of Brigham City, all of Utah

[73] Assignee: Thiokol Corporation, Odgen, Utah

[21] Appl. No.: 134,911

[22] Filed: Oct. 12, 1993

[51] Int. Cl.⁶ ............................................. F42B 10/00
[52] U.S. Cl. ............................................... 244/3.22
[58] Field of Search .................. 244/3.27, 3.28, 3.29, 244/3.24, 3.21, 3.22

[56] References Cited

U.S. PATENT DOCUMENTS

| | | | |
|---|---|---|---|
| 412,670 | 10/1889 | Ross | 244/3.27 |
| 2,941,764 | 6/1960 | Lee, Jr. et al. | 244/140 |
| 3,125,313 | 3/1964 | Soderberg | 244/87 |
| 3,343,767 | 9/1967 | Cafissi | 244/3.27 |
| 3,684,214 | 8/1972 | Kloss | 244/3.27 |
| 3,690,595 | 9/1972 | Rusbach | 244/3.27 |
| 3,724,782 | 4/1973 | Gauzza et al. | 244/3.27 |
| 3,989,191 | 11/1976 | McCullough | 239/265.15 |
| 4,011,720 | 3/1977 | Kirschner, Jr. | 60/254 |
| 4,047,667 | 9/1977 | McCullough et al. | 239/265.35 |
| 4,108,381 | 8/1978 | Sottosanti et al. | 239/265.35 |
| 4,157,788 | 6/1979 | Canfield et al. | 239/265.35 |
| 4,168,031 | 9/1979 | McCullough et al. | 239/265.19 |
| 4,209,146 | 6/1980 | Mattson | 244/3.27 |
| 4,318,271 | 3/1982 | Doukakis et al. | 60/232 |
| 4,435,023 | 3/1984 | Bolner | 308/2 R |
| 4,579,299 | 4/1986 | Lavery et al. | 244/3.22 |
| 4,699,333 | 10/1987 | Pinson | 244/3.21 |
| 4,786,019 | 11/1988 | Uken | 244/169 |
| 4,817,377 | 4/1989 | Kirschner, Jr. et al. | 60/225 |
| 4,840,024 | 6/1989 | McDonald | 60/39.461 |
| 4,867,393 | 9/1989 | Faupell et al. | 244/3.22 |
| 4,892,253 | 1/1990 | Speicher et al. | 239/265.35 |
| 4,930,541 | 6/1990 | Solberg | 137/875 |
| 4,970,857 | 11/1990 | Faupell | 60/254 |

FOREIGN PATENT DOCUMENTS 5149698  6/1993  Japan .................................. 244/3.27

OTHER PUBLICATIONS

Burt, Jr. et al., "The Aerodynamic Effectiveness of Split Flare Stabilizers,", *17th Aerospace Sciences Meeting*, Jan. 15–17, 1979.
Kolcum, "Delta Clipper Partners Set Goal For Single-Stage-to-Orbit Vehicle", *Aviation Week & Space Technology*, pp. 55–56, Feb. 3, 1992.
Smith, "DC-X Vehicle Nears Flight Test", *Aviation Week & Space Technology*, pp. 27–28, Mar. 29, 1993.
Dornheim, "DC-X Proving Initial Operational Concepts", *Aviation Week & Space Technology*, pp. 46 & 49, Oct. 11, 1993.
Wassom et al., "Integrated Aerofin/Thrust Vector Control for Tactical Missiles", *Journal of Propulsion and Power*, vol. 7, No. 3, pp. 374–381, May–Jun. 1991.
Eggers, Jr. et al., "Experimental Investigation of a Body Flare for Obtaining Pitch Stability and a Body Flap for Obtaining Pitch Control in Hypersonic Flight", *National Advisory Committee for Aeronautics*, Jan. 18, 1955.

*Primary Examiner*—Daniel T. Pihulic
*Attorney, Agent, or Firm*—Madson & Metcalf; Ronald L. Lyons

[57] ABSTRACT

A control system for use in missiles and other projectiles which provides pitch, yaw and roll control. The control system includes two opposing pairs of flaps configured in the aft end of the missile case. Each flap is attached for rotation about its leading edge. Prior to actuation, the flaps conform to the exterior surface of the missile. Upon actuation, the flaps extend into the airstream to induce aerodynamic forces. The axis of rotation of each flap is positioned at an oblique angle to the radial plane of the missile.

13 Claims, 4 Drawing Sheets

FINLESS AERODYNAMIC CONTROL SYSTEM

BACKGROUND

1. The Field of the Invention

The present invention is related to a control system for providing pitch, yaw and roll control in a guided projectile. More particularly, the present invention is related to a finless missile control system which utilizes two pairs of opposing flaps to provide control.

2. Technical Background

Increased performance capabilities of tactical aircraft, sea-skimming missiles and other tactical weapons require the development of enhanced missile guidance and control systems to provide a defense to such armaments. Current technology in missile guidance and control systems includes the use of pulse motors and thrust vector control systems.

Pulse motors provide an efficient means of managing the energy of the missile while significantly enhancing missile performance and flexibility. Missiles utilizing pulse motors may be made to be highly maneuverable, particularly under high-g requirements, by incorporating a thrust vector control system in the missile. The terminal homing of a missile is one example of an application requiring a highly maneuverable missile.

Thrust vector control systems have been developed using a variety of means, including movable nozzles, jet tabs, jet vanes and injection of fluid into the nozzle. Of these systems, optimal performance is generally obtained through the use of a movable nozzle. Until recently, however, movable nozzles were not incorporated into small, tactical missiles because they could not be made sufficiently small and light. Recent developments in this area, including the development of advanced elastomeric materials and improved flexible bearing and trapped-ball designs, have yielded viable tactical missiles having vectorable nozzles.

Notwithstanding the availability of vectorable nozzles and pulse motors for use in tactical missiles, such missiles do continue to suffer from some performance limitations. One of the principal disadvantages accompanying the use of thrust vector control systems is that they are ineffective during coast periods. To address this problem, thrust vector control systems have been integrated with aerofins to achieve conventional four-axis aerofin control during coast periods.

The use of fins, however, can significantly reduce the number of missiles which can be packaged into a given cross section, such as the payload bay of an airplane or ship. Consequently, designs have been proposed which utilize flaps or panels which lie flush with the skin of the missile when not in use but which can be actuated to extend into the airstream to control the missile. Such flap systems are generally designed to provide pitch, yaw and roll control.

A significant disadvantage to the use of prior art flap designs is the difficulty in incorporating a design which effectively achieves roll control in addition to yaw and pitch control. In order to induce the aerodynamic forces necessary to provide roll control, the flaps must be capable of actuation at an angle, with one side of the flap extending into the airstream a greater distance than the other. Some designs address this problem by utilizing a triangular shaped flap mounted to the case with a pin joint. An actuator mounted on each side of the flap then provides the capability of actuating one side to a greater degree than the other side, thereby providing roll control. As will be appreciated by one of skill in the art, however, such designs require the use of complex and bulky actuation devices. In many cases, these actuation devices cannot be successfully implemented into a tactical missile while retaining the size and weight of the missile within a desirable range.

From the foregoing, it will be appreciated that it would be an advancement in the art to provide an effective control system which will provide pitch, roll and yaw control in a guided projectile. It would be a further advancement if such a control system would provide control even during coast periods.

It would be an additional advancement in the art if such a control system could be provided which did not utilize fins and which also avoided the use of complicated actuator systems generally necessitated by control systems utilizing flaps.

Such a control system is disclosed and claimed herein.

BRIEF SUMMARY AND OBJECTS OF THE INVENTION

The present invention is directed to a novel control system for providing control in missiles and other projectiles. As used herein, the term "projectile" refers to any aerodynamic vehicle. The control system of the present invention is preferably utilized in missiles having a pulse rocket motor with a vectorable nozzle. The present invention supplements the control provided by the thrust vector control system and additionally provides control during coast periods.

In one embodiment, the control system of the present invention includes the use of two opposing pairs of flaps configured in the aft end of the missile case. Each flap is attached for rotation about its leading edge. Prior to actuation, the flaps conform to the exterior surface of the missile. Upon actuation, the flaps extend into the airstream to induce aerodynamic forces sufficient to give rise to the desired degree of pitch, yaw or roll.

Importantly, the axis of rotation of each flap is positioned at an oblique angle to the radial plane of the missile. Consequently, upon actuation, the flap imparts upon the missile a rotational force which is utilized to provide roll control. Actuation of the flaps is accomplished by simply rotating the flap about its hinge axis. This is in contrast to some prior art designs in which pin-mounted flaps necessitating multiple actuators on each flap are employed.

The flaps are positioned such that the angle of the hinge axis of adjacent flaps is equal in magnitude but opposite in direction, i.e., the angle of orientation of the hinge axis of opposing flaps is in the same direction. Thus, actuation of two adjacent flaps results in the effective cancellation of rotational forces induced by the flaps, thereby providing pure pitch or yaw control. And, actuation of opposing flaps induces rotational forces upon the missile in the same direction, thereby providing roll control while canceling pitch and yaw forces. In a preferred embodiment of the invention, the flaps are mounted with their hinge axis positioned at a 45 degree angle with respect to the radial plane of the missile and are spaced equidistantly about the periphery of the missile.

The flaps are attached to the missile through the use of bearing assemblies and hinge pins. This is preferably accomplished by mounting a bearing assembly at the end of the leading edge of each flap. A hinge pin corresponding to each bearing assembly is mounted at one end to the missile case and is positioned within the bearing assembly at the other end.

An actuation assembly may be provided for actuating the flaps in response to signals from an autopilot or other control system. In addition to providing force for actuating the flaps, the actuation system also preferably holds the flaps closed when actuation is not desired. Because of the unique manner in which the flaps are configured and mounted for rotation, the actuation assembly need only be capable of rotating the flaps about their hinge axis. Hence, the actuation assembly may be of simple design.

Thus, it is an object of the present invention to provide an improved control system which provides pitch, roll and yaw control in a guided projectile and which provides control even during coast periods.

It is a further object of the present invention to provide such a control system which does not utilize fins, but which avoids the use of complicated actuator systems generally necessitated by control systems utilizing flaps.

These and other objects and advantages of the present invention will become more fully apparent by examination of the following description of the preferred embodiments and the accompanying drawings.

BRIEF DESCRIPTION OF THE DRAWINGS

In order that the manner in which the above-recited and other advantages and objects of the invention are obtained may be understood, a more particular description of the invention briefly described above will be rendered by reference to the appended drawings. Understanding that these drawings only provide data concerning typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
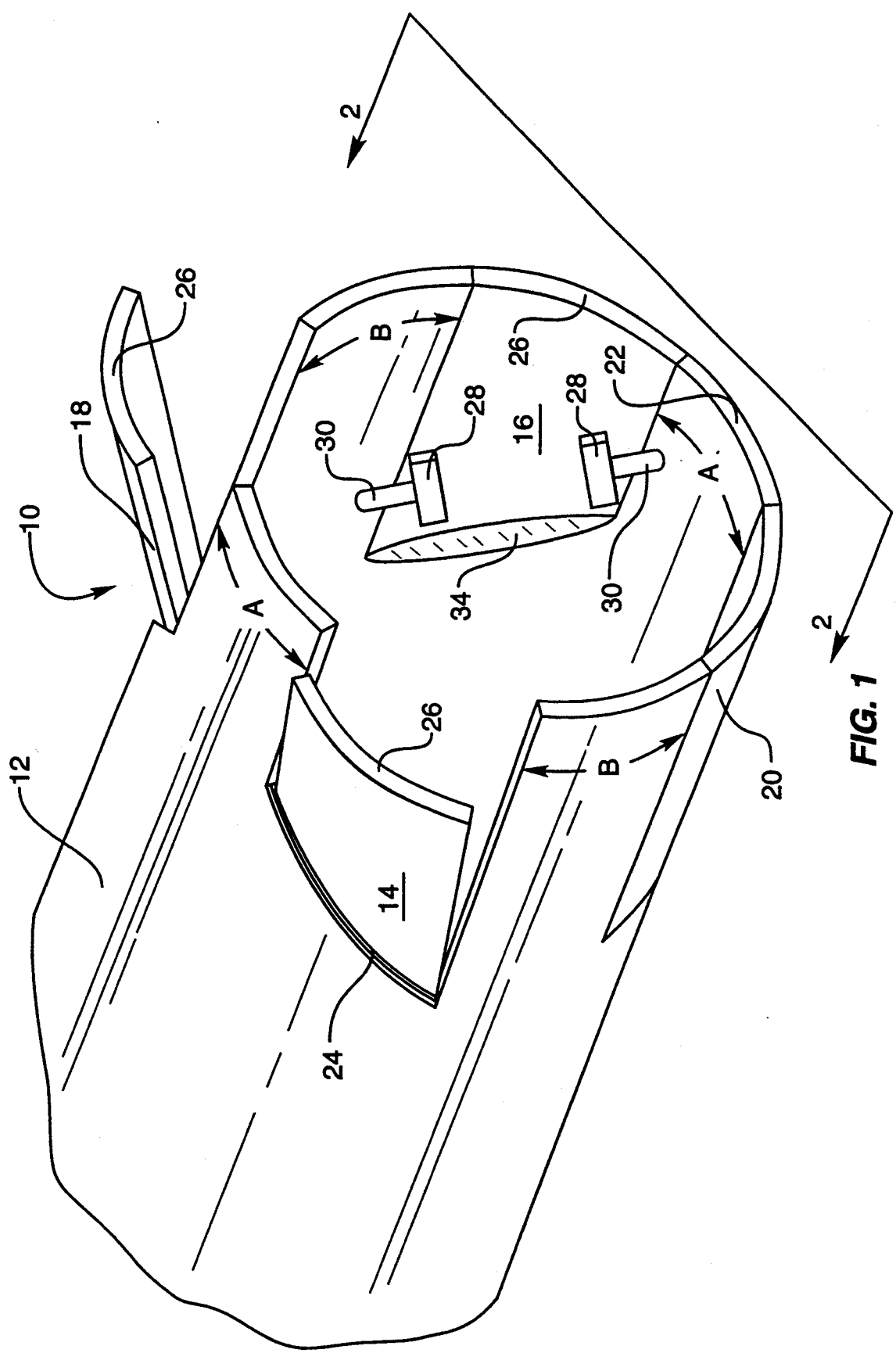
FIG. 1 is a perspective view of the aft end of a missile in which the control system of the present invention has been incorporated, with flaps actuated to provide pitch up.

Reference is now made to the figures wherein like parts are referred to by like numerals throughout. With particular reference to FIG. 1, a control system according to the present invention is generally designated at 10. The control system 10 is suited for use in a variety of projectiles, including a missile 12. In a preferred embodiment, missile 12 would include a pulse motor in combination with a thrust vector control system (not shown).

The control system of the present invention is ideally suited for use in a variety of applications. Thus, missile 12 may be any of a variety of tactical missiles, such as the Sidewinder and the AMRAAM. The control system of the present invention may also be incorporated into a variety of other projectiles, such as strategic missiles, launch vehicles, sounding rockets and glide bombs.

With continued reference to FIG. 1, the control system includes two pairs of flaps 14, 16 and 18, 20 which are configured in the aft end 22 of the missile case. Each flap is positioned on the opposite side of the missile from the other flap with which it is paired; thus, flap 14 is positioned opposite flap 16 and flap 18 is positioned opposite flap 20. Accordingly, the distance A between flap 14 and flap 18 is the same as the distance between flap 16 and flap 20. Likewise, the distance B between flap 14 and flap 20 is the same as the distance between flap 16 and flap 18.

In a preferred embodiment, the flaps are spaced equidistantly about the periphery of the rocket motor case, as is illustrated in FIG. 1, with distance A equal to distance B. However, for some applications it may be desirable to adjust the distance between flaps, with distance A being greater or less than distance B.

Figure 4:
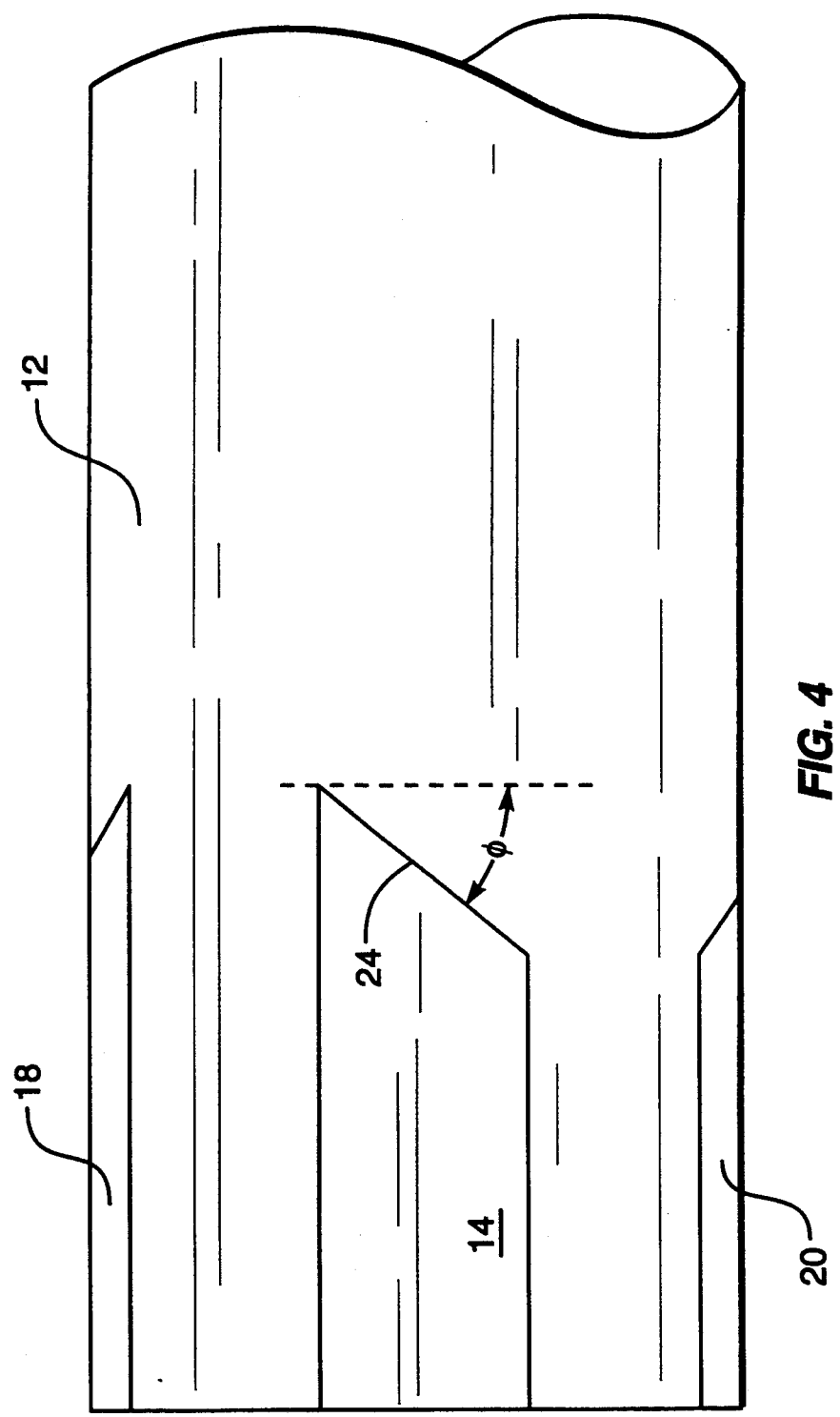
FIG. 4 is a side plan view of the missile of FIG. 1 with all flaps closed.

The flaps are configured with a leading edge 24 positioned at an oblique angle $\phi$ with respect to the radial plane of the projectile, as best illustrated in FIG. 4. Importantly, the leading edge 24 of flaps 14 and 16 is oriented in the opposite direction as the leading edge of flaps 18 and 20. In other words, the angle $\phi$ of flaps 14 and 16 is in the opposite direction as the angle $\phi$ of flaps 18 and 20. In a preferred embodiment, angle $\phi$ is approximately 45 degrees.

The trailing edge 26 of each flap is preferably configured to be substantially collinear with the perimeter of the aft end 22 of the missile 12. While it may be possible to position the flaps a distance from the aft end of the missile, it is presently believed that the aerodynamic properties of the missile and the performance of the control system of the present invention will be most favorable with the flaps positioned at the aft end of the missile.

It is possible to mount the flaps at a variety of locations along the length of the missile, including at the forward end of the missile. One of skill in the art will appreciate, however, that mounting the flaps at the aft end of the missile is preferable because this provides a more stabilizing moment arm between the center of pressure and the center of gravity.

The flaps are also preferably configured to conform to the exterior surface of the missile. Thus, when not actuated, the flaps substantially simulate the skin of the missile. Advantageously, the flaps do not increase the diameter of the missile beyond that of the case. Missiles incorporating the control system of the present invention may be packaged in and launched from a round tube. Because the effective diameter of the missile is substantially decreased by the elimination of wings and fins, the packaging density of the missiles is increased.

Figure 2:
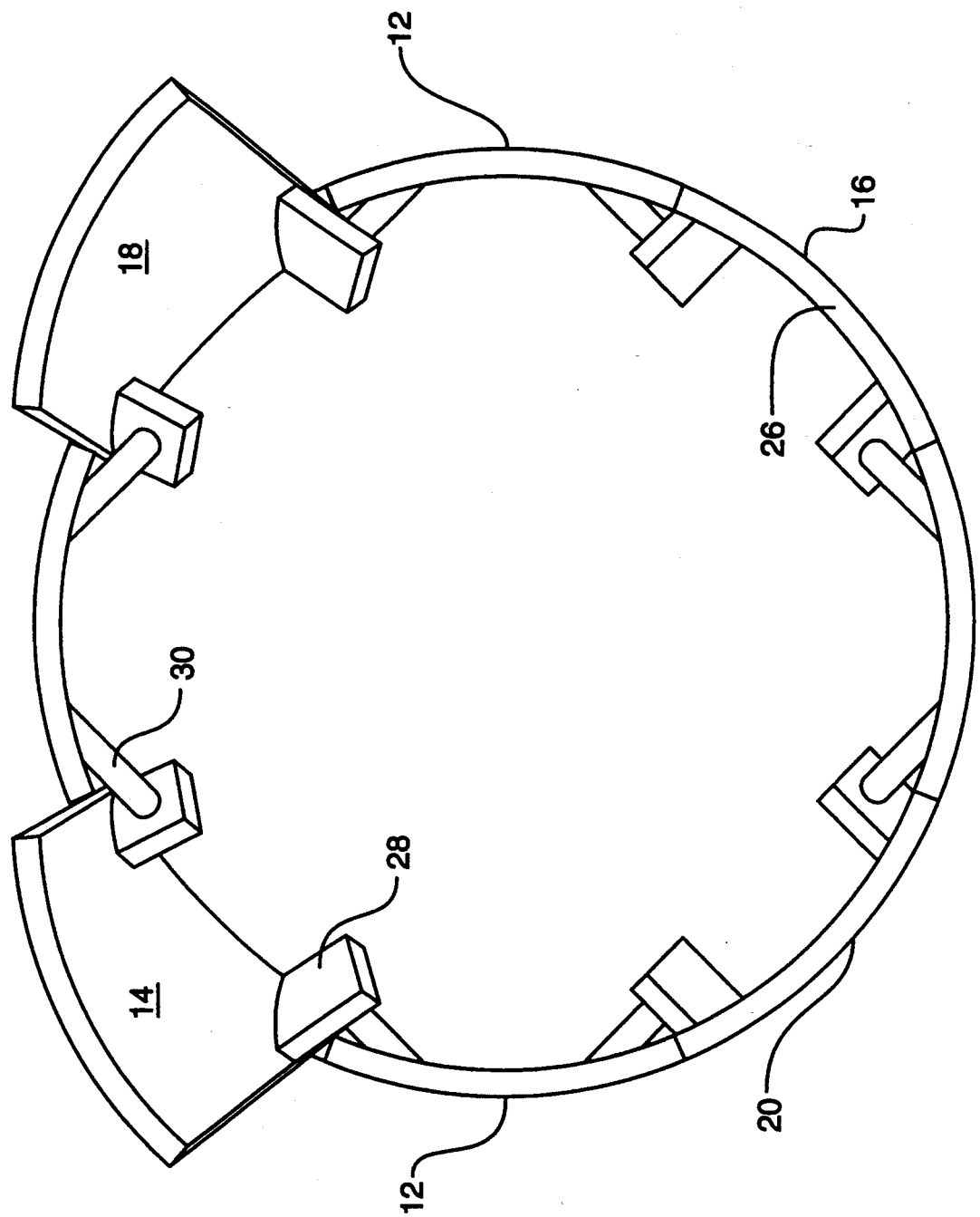
FIG. 2 is a side view taken along line 2—2 of FIG. 1.

The flaps are mounted for rotation about an axis positioned at an oblique angle to the radial plane of the missile. Preferably, the axis of rotation of the flaps is also oriented substantially parallel to the leading edge of the flaps. As illustrated in FIGS. 1 and 2, each flap includes a pair of bearings 28 attached to the interior side of the flap generally at leading edge 24. Each bearing 28 engages a journal, or rod, 30 which is attached to the inside of the case of the missile 12.

The bearing and rod assembly is preferably attached such that the axis of rotation of the flaps is positioned as close to the leading edge 24 of the flaps as is practicable. By decreasing the distance between the axis of rotation and the leading edge 24, the amount the flaps are capable of extending upon actuation is maximized.

The rod 30 may be attached to the missile in a variety of ways, including by welding or by threaded attachment. As one of skill in the art will appreciate, it would also be possible to attach bearing 28 to the missile case and attach the end of rod 30 to the inside wall of the flap.

Although the embodiment of the present invention illustrated in the figures shows the flaps mounted to the missile along the sides of the flaps, it should be recognized that the flaps may be mounted in a variety of locations. For example, for some applications it may be desirable to mount the flaps at the center of the leading edge or more towards the aft end of the flap. Any means of mounting the flaps for rotation about an axis oriented at an oblique angle to the radial plane of the projectile should be construed to be within the scope of the present invention.

The flaps may be actuated by any of a variety of actuation devices. Because actuation of the flaps occurs merely by rotating the flaps about their axes of rotation, i.e., about rod 30, actuation can be accomplished by any device capable of applying the required force to rotate the flap about its axis of rotation. It is presently preferred to employ an actuation device which would serve both to actuate the flaps when required, but which would also affirmatively hold the flaps closed when actuation is not desired.

The flaps are preferably mounted to the missile as close to the leading edge 24 as is possible. As best illustrated in FIG. 1, the edge 34 of the missile case adjacent to the leading edge 24 of each flap is chamfered. The chamfered edge 34 should be configured to permit the flap to open without the leading edge 24 of the flap interfering with the missile case. Alternative embodiments of the invention may avoid including a chamfered edge depending on the manner in which the flap is mounted to the missile.

In operation, the control system of the present invention may be used either alone or in combination with other control systems, such as a thrust vector control system utilizing a vectorable nozzle. The present invention is ideal for use with a pulse rocket motor having a thrust vector control system, as the present invention will provide control even during coast periods of the pulse motor.

When pitch up is desired, flaps 14 and 18 may be actuated, as is illustrated in FIGS. 1 and 2. If pitch down is desired, flaps 16 and 20 are actuated. Likewise, yaw left is produced by actuating flaps 14 and 20 with yaw right being produced by actuating flaps 16 and 18.

As discussed above, the angle $\phi$ of the leading edge (and the axis of rotation) of any flap is equal and opposite to the angle of the leading edge on the adjacent flaps. Thus, when two adjacent flaps are actuated, rotational forces on the missile imposed by the two flaps cancel each other. The resultant force on the missile is pure pitch (or yaw) along a line between the two flaps.

Figure 3:
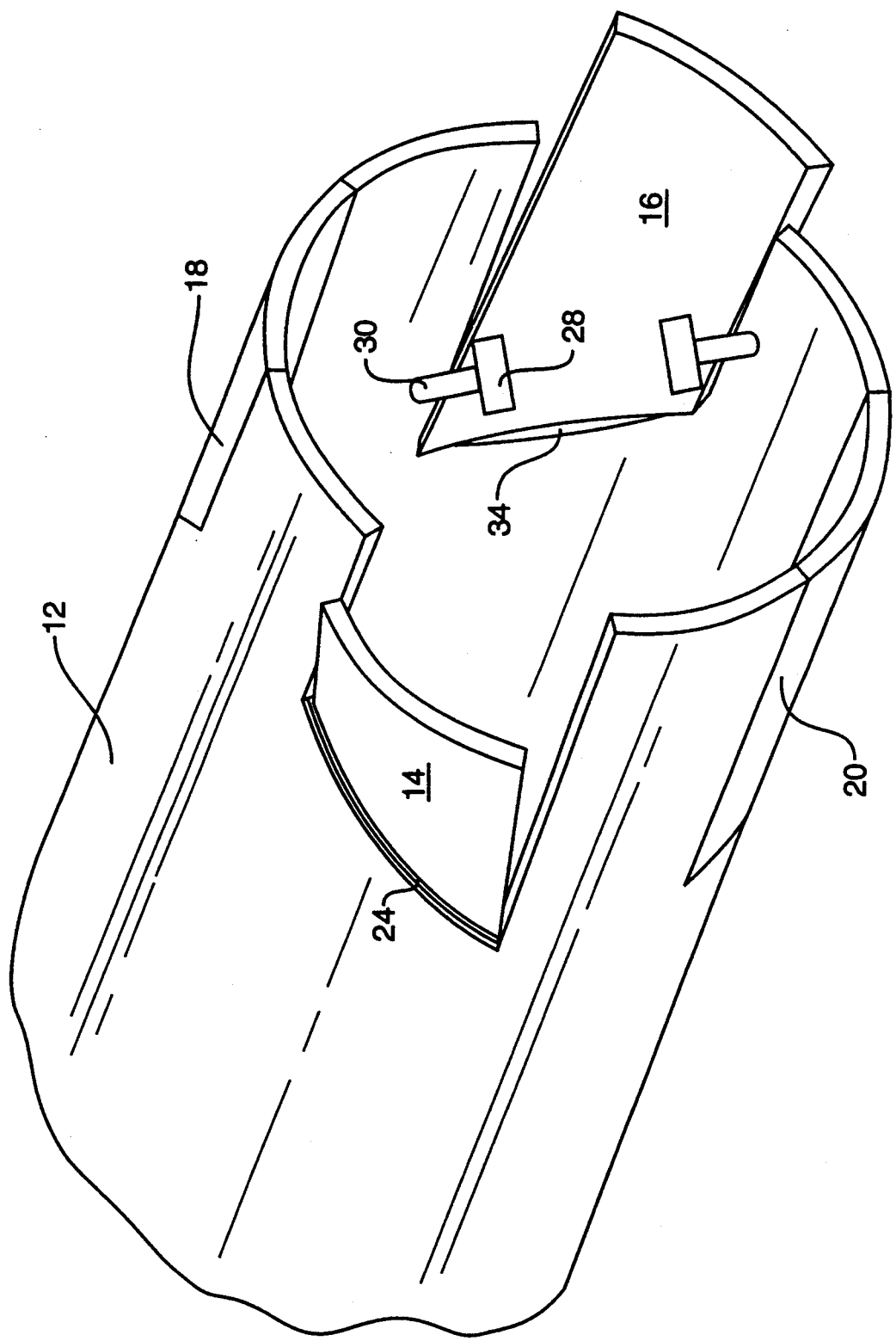
FIG. 3 is a perspective view of the missile of FIG. 1, with flaps actuated to provide roll.

Thus, rotational control of the missile is gained by actuating opposing flaps. Counterclockwise rotation is achieved by actuating flaps 14 and 16, as is illustrated in FIG. 3. Likewise, clockwise rotation is imparted to the missile by actuating flaps 18 and 20.

From the foregoing, it can be seen that the present invention provides an improved missile control system which provides pitch, roll and yaw control in a guided projectile. The present invention is of particular use in a tactical missile having a pulse motor with a thrust vector control system. When so employed, the control system of the present invention can be used to supplement the control provided by the thrust vector control system to provide a highly maneuverable missile. Additionally, the present invention may provide the sole means of control for the missile during coast periods.

Importantly, the present invention provides control without the utilization of fins or wings which add to the effective diameter of the missile and limit the number of missiles which can be carried by an airplane or ship. Also, because of the unique design of the flaps, the use of complicated actuator systems is avoided.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A control system for providing control in a projectile having an elongate case, the control system comprising:
   a first pair of flaps configured in opposing sides of the projectile case, each flap including a leading edge which is attached for rotation about an axis oriented at a first oblique angle to the radial plane of the projectile;
   a second pair of flaps configured in opposing sides of the projectile case, each flap of the second pair including a leading edge which is attached for rotation about an axis oriented at a second oblique angle to the radial plane of the projectile, the second oblique angle being oriented in the opposite direction of the first oblique angle; and
   means for rotating the first and second pair of flaps.

2. A control system as defined in claim 1, wherein the projectile case has a forward and an aft end, and the first and second pair of flaps are positioned towards the aft end of the projectile.

3. A control system as defined in claim 2, wherein each of the first and the second pair of flaps has a trailing edge collinear with the perimeter of the aft end of the projectile.

4. A control system as defined in claim 1, wherein the first oblique angle and the second oblique angle are of equal magnitude.

5. A control system as defined in claim 4, wherein the first angle and the second angle are approximately 45 degrees.

6. A control system as defined in claim 1, wherein the leading edge of the first and the second pair of flaps is configured substantially parallel to the axis of rotation of the corresponding flap.

7. A control system as defined in claim 1, wherein the flaps are positioned equidistantly about the perimeter of the projectile.

8. A control system for providing control in a projectile having an elongate case with a forward and an aft end, the control system comprising:
   a first pair of flaps oppositely positioned in opposing sides of the projectile case towards the aft end of the projectile, each flap having a leading edge and being attached generally at the leading edge for rotation about an axis oriented at a first oblique angle to the radial plane of the projectile;

a second pair of flaps oppositely positioned in opposing sides of the projectile case towards the aft end of the projectile and spaced equidistantly from the first pair of flaps, each flap of the second pair of flaps having a leading edge and being attached generally at the leading edge for rotation about an axis oriented at a second oblique angle to the radial plane of the projectile, the second oblique angle being equal and opposite to the first oblique angle; and means for rotating the first and second pair of flaps.

9. A control system as defined in claim 8, wherein the first angle and the second angle are approximately 45 degrees.

10. A control system as defined in claim 8, wherein each of the first and the second pair of flaps has a trailing edge collinear with the perimeter of the aft end of the projectile.

11. A control system as defined in claim 8, wherein the flaps each have an exterior surface which conforms to the exterior surface of the projectile.

12. A control system as defined in claim 8, wherein the leading edge of each flap has an end and further comprising bearing assemblies mounted generally at the end of the leading edge of each flap and a hinge pin corresponding to each bearing assembly, each hinge pin having one end mounted to the projectile and having a second end attached for rotation to the corresponding bearing assembly.

13. A control system as defined in claim 8, wherein the means for rotating the first and second pair of flaps comprises an actuation assembly configured to actuate each flap and prevent movement of the flaps if the flaps are acted upon by external forces tending to actuate the flaps.

* * * * *